United States Patent [19]

Kaneyuki et al.

[11] Patent Number: 4,727,307
[45] Date of Patent: Feb. 23, 1988

[54] CONTROL APPARATUS FOR VEHICULAR GENERATOR

[75] Inventors: Kazutoshi Kaneyuki; Shiro Iwatani; Keiichi Komurasaki; Yoshiyuki Iwaki, all of Himeji, Japan

[73] Assignee: Mitsubishi Denki Kabushiki Kaisha, Japan

[21] Appl. No.: 885,830

[22] Filed: Jul. 15, 1986

[30] Foreign Application Priority Data

Jul. 19, 1985 [JP] Japan ............................ 60-160864
Jul. 23, 1985 [JP] Japan ............................ 60-161197
Jul. 23, 1985 [JP] Japan ............................ 60-161198

[51] Int. Cl.$^4$ ............................................. H02J 7/14
[52] U.S. Cl. .................................... 322/22; 322/25; 322/29; 322/34
[58] Field of Search ................ 322/22, 25, 27, 28, 322/29, 32, 33, 34; 320/35, 64

[56] References Cited

U.S. PATENT DOCUMENTS

| | | | |
|---|---|---|---|
| 4,368,417 | 1/1983 | Matsuyama | 322/29 |
| 4,385,270 | 5/1983 | Balan et al. | 322/33 X |
| 4,388,587 | 6/1983 | Lamoth et al. | 322/28 X |
| 4,470,003 | 9/1984 | Mitchell | 322/28 X |
| 4,612,493 | 9/1986 | Katashima et al. | 320/69 |
| 4,629,968 | 12/1986 | Butts et al. | 322/29 |

FOREIGN PATENT DOCUMENTS 58-87432 6/1983 Japan.
59-63699 4/1984 Japan.

*Primary Examiner*—R. J. Hickey
*Attorney, Agent, or Firm*—Leydig, Voit & Mayer

[57] ABSTRACT

A control apparatus for a vehicular generator for use in an automobile, etc., in which the temperature of the generator is detected so as to control switching of the field current of the generator when the temperature of the generator is below a predetermined value, so that the cold output current and cold drive torque of the generator are substantially the same as the hot output current and hot drive torque of the generator.

5 Claims, 9 Drawing Figures

CONTROL APPARATUS FOR VEHICULAR GENERATOR

BACKGROUND OF THE INVENTION

This invention relates to a control apparatus for a vehicular generator for use in vehicles, for example, automobiles.

FIG. 1 shows a prior-art control apparatus of the specified type, in which a generator 1 is driven by an engine not shown and is constructed of an armature coil 101 and a field coil 102. A rectifier 2 subjects the A-C outputs of the generator 1 to full-wave rectification, and has output ends 201, 202 and 203. The output end 201 delivers a main output, the output end 202 serves for exciting the field coil 102 and for detecting the voltage of a voltage regulator 3 to be described below, and the output end 203 serves for grounding. The voltage regulator 3 regulates the output voltage of the generator 1 to a predetermined value, and is constructed of components to be mentioned below. Numerals 301 and 302 designate voltage dividing resistors which divide the output voltage of the output end 202 of the rectifier 2, nemeral 303 designates a Zener diode which detects a potential resulting from the voltage division of the voltage dividing resistors 301 and 302 and which is enabled when the potential has reached a predetermined value, and numeral 304 designates a transistor which is turned 'on' when the Zener diode 303 is enabled and which controls the on/off action of a transistor 305 to be described below. The transistor 305 interrupts and controls a field current which flows through the field coil 102 of the generator 1. The voltage regulator 3 further includes the base resistor 306 of the transistor 305, and a diode 307 which is connected in parallel with the field coil 102 of the generator 1 and which absorbs the interruption surge of this field coil. Numeral 4 indicates batteries carried on the vehicle, numeral 5 the various electric loads of the vehicle, numeral 6 a key switch, and numeral 7 a resistor for the initial excitation of the field coil 102 of the generator 1. FIG. 2 shows the curves C of the output current of the generator 1 and the curves T of the driving torque thereof versus the rotational speed (revolutions per minute) of the generator 1 under the full-load condition thereof as based on the prior-art apparatus. In this figure, broken lines correspond to a cold condition, and solid lines a hot condition.

In operation, when the key switch 6 is closed in starting the engine (not shown) an initial excitation current flows from the batteries 4 to the field coil 102 of the generator 1 through the key switch 6 as well as the initial excitation resistor 7, whereby the generator 1 is placed in a state capable of generating power. When the engine is subsequently started, the generator 1 begins to generate power. In the voltage regulator 3 which receives the output voltage of the output end 202 of the rectifier 2, when this output voltage exceeds a predetermined value previously set by the voltage dividing resistors 301 and 302 and the Zener diode 303, the Zener diode 303 is enabled to turn 'on' the transistor 304. Besides, when the aforementioned output voltage becomes less than the predetermined value, the Zener diode 303 is disabled to turn 'off' the transistor 304. The turn-on and -off of the transistor 304 controls the 'off' and 'on' states of the transistor 305, respectively, and thus interrupts the current of the field coil 102 of the generator 1 so as to regulate the output voltage of the generator 1 to the predetermined value. In this manner, the voltage regulator 3 repeats the above operation to control the state the generator 1 is in, and the generator 1 supplies electric power from the output end 201 of the rectifier 2 to the batteries 4 and various electric loads 5 of the vehicle with the regulated output voltage.

The characteristic curves of the output currents and the driving torques of the generator 1 of the prior-art apparatus controlled as described above, under the cold and hot conditions become as shown in FIG. 2. More specifically, as the generator 1 shifts from the cold state thereof immediately after beginning the power generation, to the hot state thereof in consequence of the self-heating thereof and the rise of an ambient temperature, the output current lowers gradually as seen from the characteristic curve of the cold condition to that of the hot condition as illustrated in FIG. 2. In addition, the nominal output of the generator 1 is determined by the hot condition characteristic, and the cold condition characteristic is merely an allowance for guaranteeing the hot condition characteristic. Ideally, it is considered best that the characteristics under the cold condition and the hot condition be substantially in agreement. On the other hand, the driving torque of the generator 1 lowers gradually from the cold condition characteristic to the hot condition characteristic as the output current lowers. In addition, the driving torque exhibits a peculiar curve which has a peak indicated by a point A in FIG. 2 at a comparatively low speed of rotation.

The driving torque of the generator 1 acts as a load on the engine of the vehicle. Especially in the vicinity of the aforementioned peak at the point A, the engine is at the low speed of rotation and the output torque thereof is comparatively small, so that the driving torque of the generator 1 acts as a very high load.

Since the prior-art control apparatus for the vehicular generator is constructed and operated as described above, the difference between the cold-condition driving torque and the hot-condition driving torque acts as a surplus load on the engine. In particular, immediately after the starting of the engine, the torque generated by the engine is unstable, and the cold-condition driving torque of the generator becomes a large value. Therefore, the degree of influence of the generator driving torque is high to incur the problems that the rotation of the engine is not smooth and becomes unstable, and that the quantity of fuel consumed by the engine becomes large. Further, that the above degree of influence increases at a cryogenic temperature.

SUMMARY OF THE INVENTION

This invention has been made in order to eliminate the problems as mentioned above, and has for its object to provide a control apparatus for a vehicular generator which can suppress the cold-condition driving torque of the generator without decreasing the effective output thereof.

To the accomplishment of the object, a first aspect of performance of this invention consists in that the temperature of the generator is detected and that the field current of the generator is controlled in accordance with the detected output signal, whereby the output current of the generator under the cold condition thereof can be suppressed to restrain the driving torque thereof.

In another aspect of performance, besides the detection of the temperature of the generator, the rotational speed of the generator is detected, and the field current of the generator is controlled according to the detected output signals.

BRIEF DESCRIPTION OF THE DRAWINGS

FIG. 1 is a circuit diagram showing a prior-art control apparatus for a vehicular generator, while

FIG. 3 is a circuit diagram showing a control apparatus for a vehicular generator according to an embodiment of this invention, while

FIG. 5 is a circuit diagram showing a control apparatus according to another embodiment of this invention, while

DESCRIPTION OF THE PREFERRED EMBODIMENTS

Figure 1:
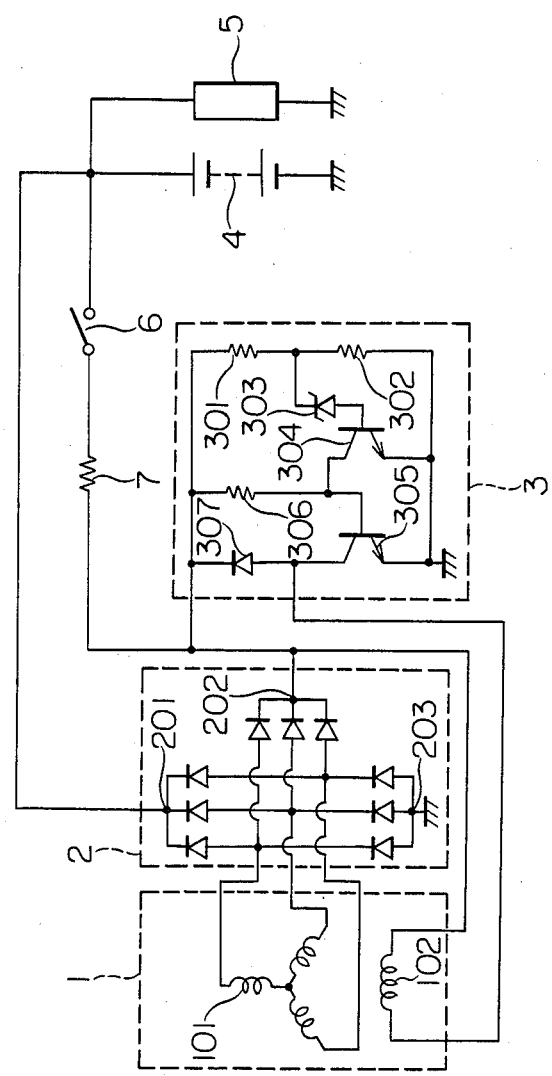
Figure 2:
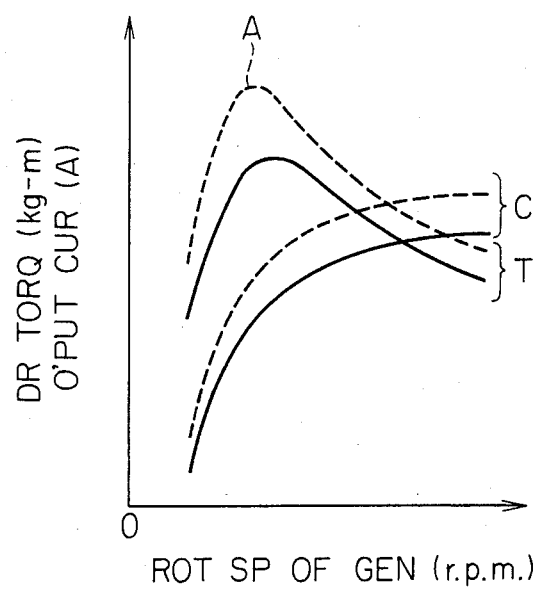
FIG. 2 is a graph showing the characteristic curves of the generator based on the prior-art control apparatus.
Figure 3:
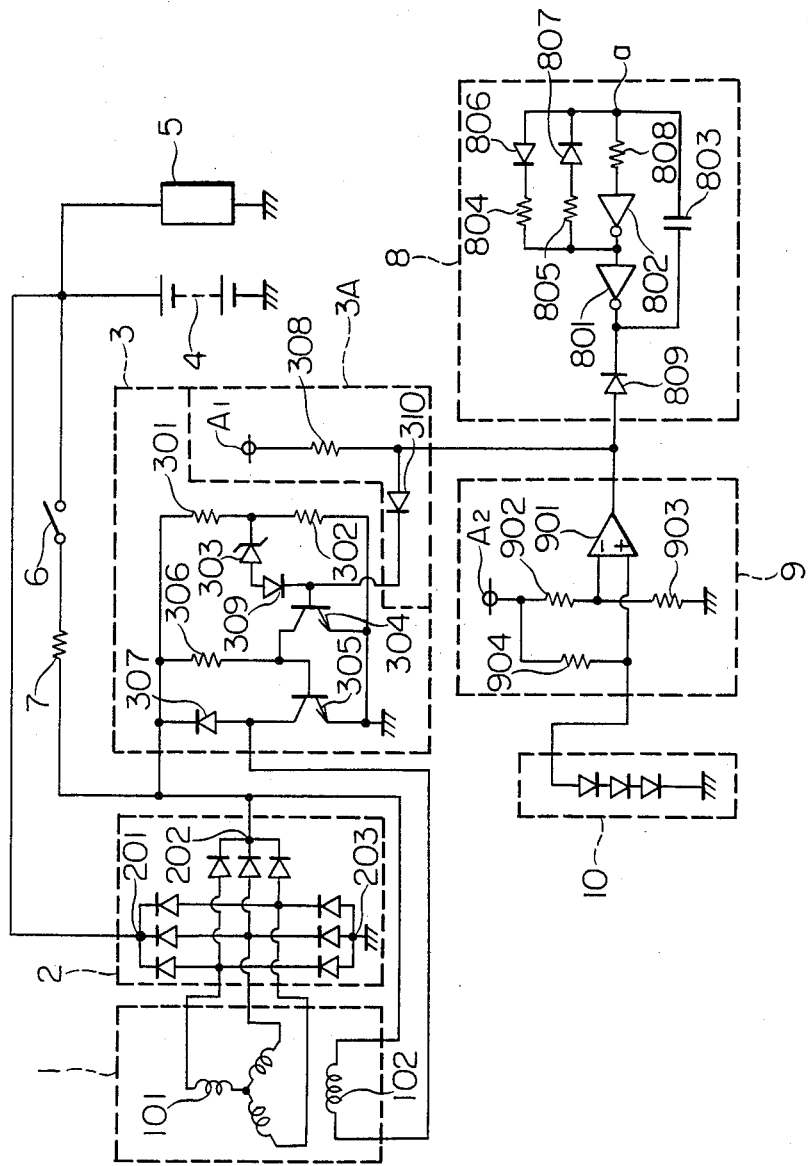

Now, an embodiment of this invention will be described with reference to the drawings. In FIG. 3, the same symbols as in FIG. 1 indicate portions identical to those of the prior-art example. Symbol $A_1$ denotes a power source. A base resistor 308 has one end connected to the power source $A_1$ and has the other end connected to the base of the transistor 304 through a reverse current preventing diode 310. A reverse current preventing diode 309 is connected between a Zener diode 303 and the base of the transistor 304. Symbols 3A denotes a switching control power source portion which is constructed of the power source $A_1$, the base resistor 308 and the reverse current preventing diode 310 mentioned above.

Shown at numeral 8 is a constant duty factor oscillator which is well known and which is constructed of components to be described below. Numerals 801 and 802 designate inverters, numeral 803 a capacitor, and numerals 804 and 805 resistors which construct a bidirectional charge-and-discharge circuit along with the capacitor 803. Numerals 806 and 807 indicate reverse current preventing diodes, numeral 808 the input protection resistor of the inverter 802, and numeral 809 a reverse current preventing diode. An example of switching control means is constructed of the switching control power source portion 3A and the constant duty factor oscillator 8 mentioned above.

Numeral 9 indicates a temperature detector which is an example of temperature level decision means, and which is constructed of components to be described below. Symbols $A_2$ denotes a power source, and numeral 901 a comparator. Voltage dividing resistors 902 and 903 are connected in series, with the node of the series connection connected to the (−) input of the comparator 901, and divide the voltage of the power source $A_2$, thereby to afford the reference voltage of the comparator 901. A biasing resistor 904 for a temperature detecting device 10 has one end connected to the power source $A_2$, and has the other end connected to the temperature detecting device 10 as well as the (+) input of the comparator 901.

In the present embodiment, the temperature detecting device 10 utilizes the negative temperature coefficient of the forward voltage of a diode. It is mounted on a heat generating part within a generator 1, or on the control apparatus installed on the generator 1, including a voltage regulator 3, the switching control power source portion 3A, the constant duty factor oscillator 8 and the temperature detector 9. The anode side of the reverse current preventing diode 809 and the output side of the comparator 901 (which is of the open collector type) are connected to the node between the base resistor 308 and the reverse current preventing diode 310.

Figure 4:
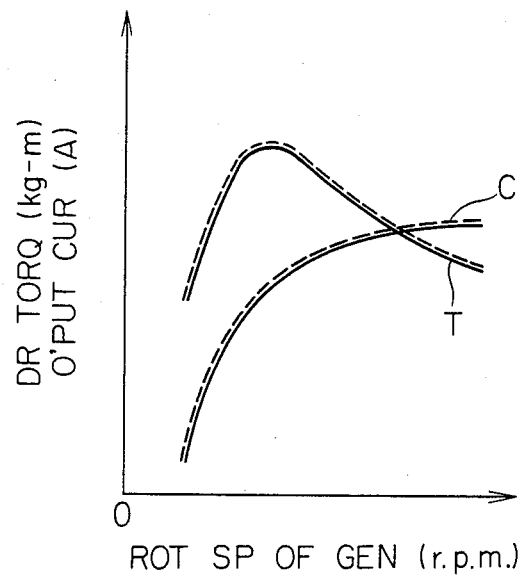
FIG. 4 is a graph showing the characteristic curves of the generator based on the embodiment.

FIG. 4 shows the curves C of the output currents and the curves T of the driving torques of the generator 1 versus the rotational speed (r. p. m.) of the same under the full load condition thereof as based on this invention. Broken lines indicate the characteristic curves in a cold condition, and solid lines those in a hot condition.

Next, the operation of the embodiment will be described. The constant duty factor oscillator 8 utilizes a known astable multivibrator which is based on an inverter, and the operation of which shall be explained assuming that the Zener diode 303 of the voltage regulator 3 is nonconductive and that the output of the comparator 901 of the temperature detector 9 is at an "H" (high) level. First, assuming that the output of the inverter 801 is at the "H" level, the output of the inverter 802 is at an "L" (low) level, and current flows through a path extending along the output end of the inverter 801→is at the capacitor 803→the reverse current preventing diode 806→the resistor 804→the output end of the inverter 802. Thus, the potential of and, in turn, the input potential of the inverter 802 lowers gradually. At last, the input of the inverter 802 becomes an "L" level detection potential, whereupon the inverter 802 delivers the "H" level and the inverter 801 delivers the "L" level. When the outputs are inverted in this manner, a forward charge circuit opposite in the direction to the initial circuit is formed in which current flows through a path extending along the output end of the inverter 802→the resistor 805→the reverse current preventing diode 807→the capacitor 803→the output end of the inverter 801. Simultaneously with the inversion, the potential of the point a is lowered even further to ensure the "L" level of the input of the inverter 802 and to stabilize the operation. Subsequently, the potential of the point a is gradually raised by the forward charge circuit stated above. At last, the input of the inverter 802 becomes an "H" level detection potential, whereupon the inverter 802 delivers the "L" level and the inverter 801 delivers the "H" level and returns into the initial state. At the same time that the inverter 801 is inverted into the initial state, the forward charge circuit of the capacitor 803 is inverted into its initial state. As a result, the potential of the point a is raised even further to ensure the "H" level of the input of the inverter 802 and to stabilize the operation.

As understood from the foregoing, the period of time during which the output of the inverter 801 is at the "H" level is determined by the capacitor 803 and the resistor 804, while the period of time during which it is at the "L" level is determined by the capacitor 803 and the resistor 805. Accordingly, the periods of time of the "H" level and the "L" level are different values, and the proportion of the period of time of the "H" level to one cycle, that is, the duty factor, is set at a certain fixed value. Simultaneously with the closure of the key switch 6, the above operations are repeated.

Next, the operations of the constant duty factor oscillator 8, voltage regulator 3 and switching control power source portion 3A will be described assuming that the output of the temperature detector 9 be at the "H" level.

First, when the Zener diode 303 of the voltage regulator 3 is nonconductive and the output of the fixed duty factor oscillator 8, namely, that of the inverter 801 is at the "H" level, the transistor 304 is supplied with a base current from the power source $A_1$ and through the base resistor 308 as well as the reverse current preventing diode 310 and becomes the conductive state to render the transistor 305 nonconductive. Subsequently, when the output of the fixed duty factor oscillator 8 becomes the "L" level, the base resistor 308 is grounded to the output end of the inverter 801 through the reverse current preventing diode 809, so that the transistor 304 becomes nonconductive to render the transistor 305 conductive. As thus far described, the transistor 304 is forcibly on/off-controlled irrespective of the output voltage of the generator 1 by the output of the fixed duty factor oscillator 8. That is, the field current of the field coil 102 of the generator 1 is interrupted by the on/off control of the transistor 305, and it is forcibly limited. Meanwhile, since the output of the generator 1 is determined by a field magnetomotive force based on the field coil 102, the limitation of the field current flowing through the field coil 102 results in limiting the output of the generator 1. Besides, in a case where the electric loads 5 of a vehicle are small relative to the limited output of the generator 1, the generator 1 has a margin for its ability of power generation, and the output voltage thereof rises. When this output voltage exceeds the predetermined regulation voltage of the voltage regulator 3, namely, the Zener voltage of the Zener diode 303, the Zener diode 303 is turned 'on'. Then, even when the output of the fixed duty factor oscillator 8 is at the "L" level, the transistor 04 is rendered conductive and the transistor 305 is rendered nonconductive so as to prevent the field current from flowing through the field coil 102, whereby the output voltage of the generator 1 is regulated to a predetermined value.

Next, the operations of the temperature detector 9 and the temperature detecting device 10 will be described. The temperature detecting device 10 delivers a forward voltage generated in such a way that a slight forward current is caused to flow by utilizing the negative temperature coefficient of the forward voltage of a diode as stated before. That is, the device 10 utilizes the property that the output voltage thereof becomes high at a low temperature and becomes low at a high temperature. The temperature detector 9 is a level detector which detects the level of a temperature detection signal from the temperature detecting device 10 by the use of the comparator 901. Specifically, it compares the output voltage of the temperature detecting device 10, using as a reference voltage comprising a potential which is obtained by dividing the voltage of the power source $A_2$ by means of the resistors 902 and 903 with the voltage of the temperature detecting device 10. More specifically, when the temperature detecting device 10 is at a low temperature and provides an output voltage higher than the reference voltage, that is, the generator 1 is under a cold condition, the comparator 901 delivers the "H" level. To the contrary, when the output voltage of the temperature detecting device 10 is lower than the reference voltage in case of a high temperature, that is, the generator 1 is under a hot condition, the comparator 901 delivers the "L" level. Thus, when the output of the comparator 901 is at the "H" level, the potential of the node between the base resistor 308 and reverse current preventing diode 310 of the switching control power source portion 3A is raised, and the on/off action of the transistor 304 depends upon the state of the Zener diode 303 and the oscillation of the fixed duty factor oscillator 8. On the other hand, when the output of the comparator 901 is at the "L" level, the potential of the node between the base resistor 308 and reverse current preventing diode 310 of the switching control power source portion 3A is lowered, and the on/off action of the transistor 304 of the voltage regulator 3 depends upon only the state of the Zener diode 303 as in the operation of the prior-art voltage regulator.

As understood from the foregoing, when the generator 1 is cold immediately after the starting of the engine, the output current thereof is suppressed, and when the generator 1 is hot, the ordinary output current is generated. These characteristic curves are shown in FIG. 4. As also seen from the curves, the cold-condition output current is suppressed substantially equal to the hot-condition output current, whereby the cold-condition driving torque of the generator 1 can be suppressed equal to the hot-condition driving torque.

In the embodiment, the cold-condition output current or cold-condition driving torque of the generator 1 has been suppressed to bring the characteristic of the cold condition into substantial agreement with the characteristic of the hot condition. However, this is not restrictive, and it is also possible to set, for example, a characteristic having values lower than the characteristic of the hot condition or a characteristic having values between the characteristic of the cold condition and that of the hot condition.

Figure 5:
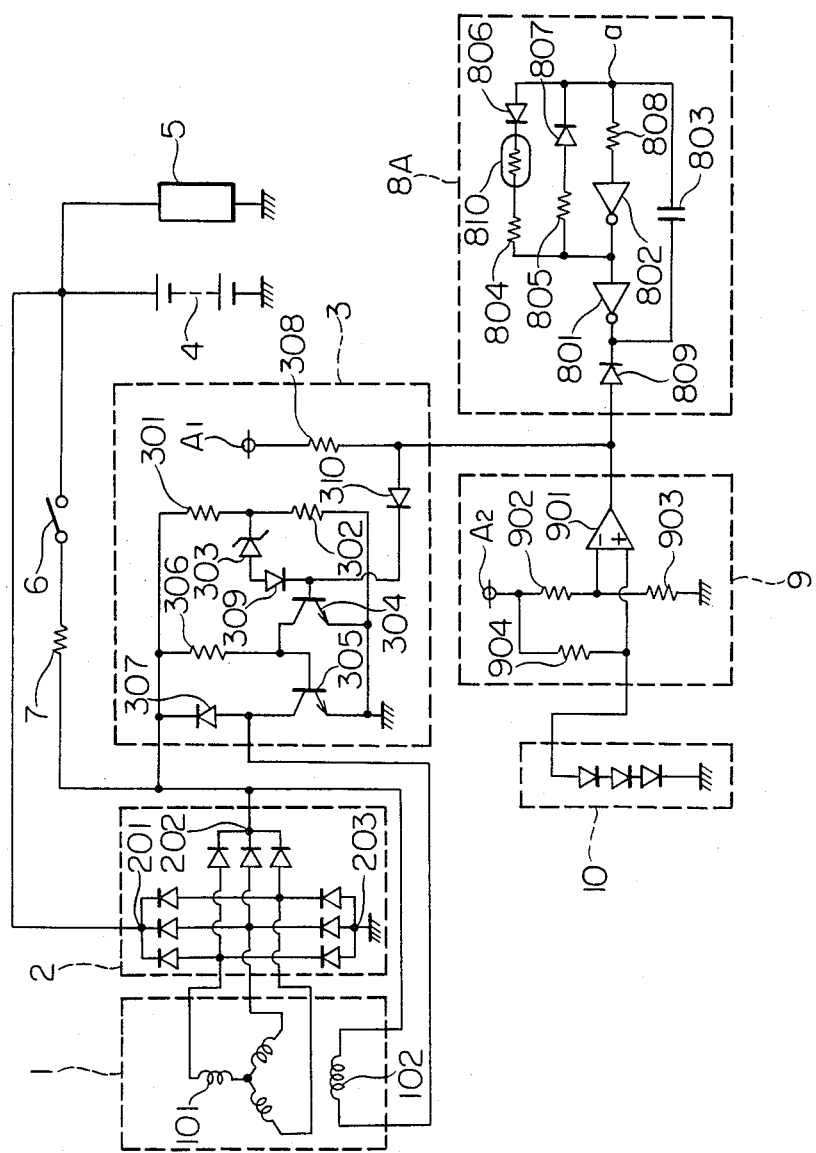

FIG. 5 shows another embodiment of this invention. In this embodiment, a thermistor 810 is added to the fixed duty factor oscillator 8 in FIG. 3 so as to form a variable duty factor oscillator 8A whose output changes depending upon temperatures.

The thermistor 810 is mounted on the control apparatus along with the temperature detecting device 10, and has the property that the resistance value thereof lowers with the temperature rise of the generator 1.

According to such a construction, the period of time during which the output of the inverter 801 is at the "H" level is determined by the charging time constant of the capacitor 803, thermistor 810 and resistor 804, while the period of time during which it is at the "L" level is determined by the charging time constant of the capacitor 803 and resistor 805, and the periods of time of the "H" and "L" levels become different values. When the generator 1 is cold, the proportion of the "H" level to one cycle, namely, the duty factor is set at a certain fixed value. Further, the resistance of the thermistor 810 decreases with the temperature rise of the generator. Therefore, the oscillator 8A operates so that the period of time of the "H" level of the inverter 801 may be gradually shortened, namely, that the duty factor may be gradually decreased. Simultaneously with the closure of the key switch 6, the above operations are repeated.

In this embodiment, accordingly, as the temperature of the generator 1 rises, the period of time of the "H"

output level of the inverter 801 is gradually shortened, and the period of time of the turn-on of the transistor 304 of the voltage regulator 3, in other words, the period of time of the turn-off of the transistor 305 is shortened. Therefore, the duty factor of the field coil 102 becomes high, a mean voltage to be applied to the field coil 102 rises, and the lowering of the field current is suppressed. As a result, the output current of the generator is suppressed from lowering and is corrected.

Besides, in a case where the electric loads 5 of the vehicle are small relative to the limited output of the generator 1, the generator 1 has a margin for its ability of power generation, and the output voltage thereof rises. When this output voltage exceeds the predetermined regulation voltage of the voltage regulator 3, the Zener diode 303 is turned 'on'. Then, when the output of the variable duty factor oscillator 8A is at the "L" level, the transistor 304 is rendered conductive, and the output voltage of the generator 1 is regulated to the predetermined value.

Figure 6:
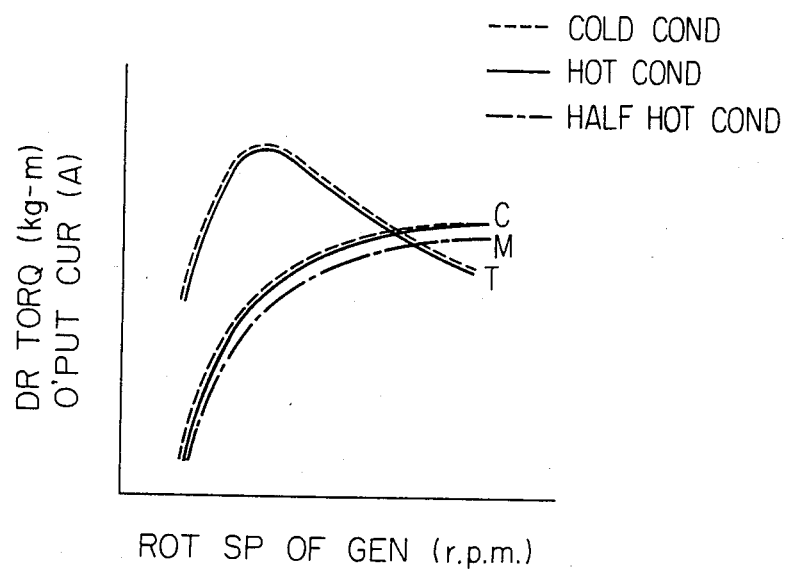
FIG. 6 is a graph showing the characteristic curves of a generator in FIG. 5.

As understood from the above description, under the cold state and half hot state of the generator 1 before the hot state thereof is reached, the output current of the generator is sequentially corrected and suppressed. Therefore, while the hot-condition output which is the nominal output of the generator is properly guaranteed, the cold-condition driving torque can be suppressed as indicated by characteristic curves in FIG. 6. Here, a dot-and-dash line M indicates the output current characteristic under the half hot condition.

Figure 7:
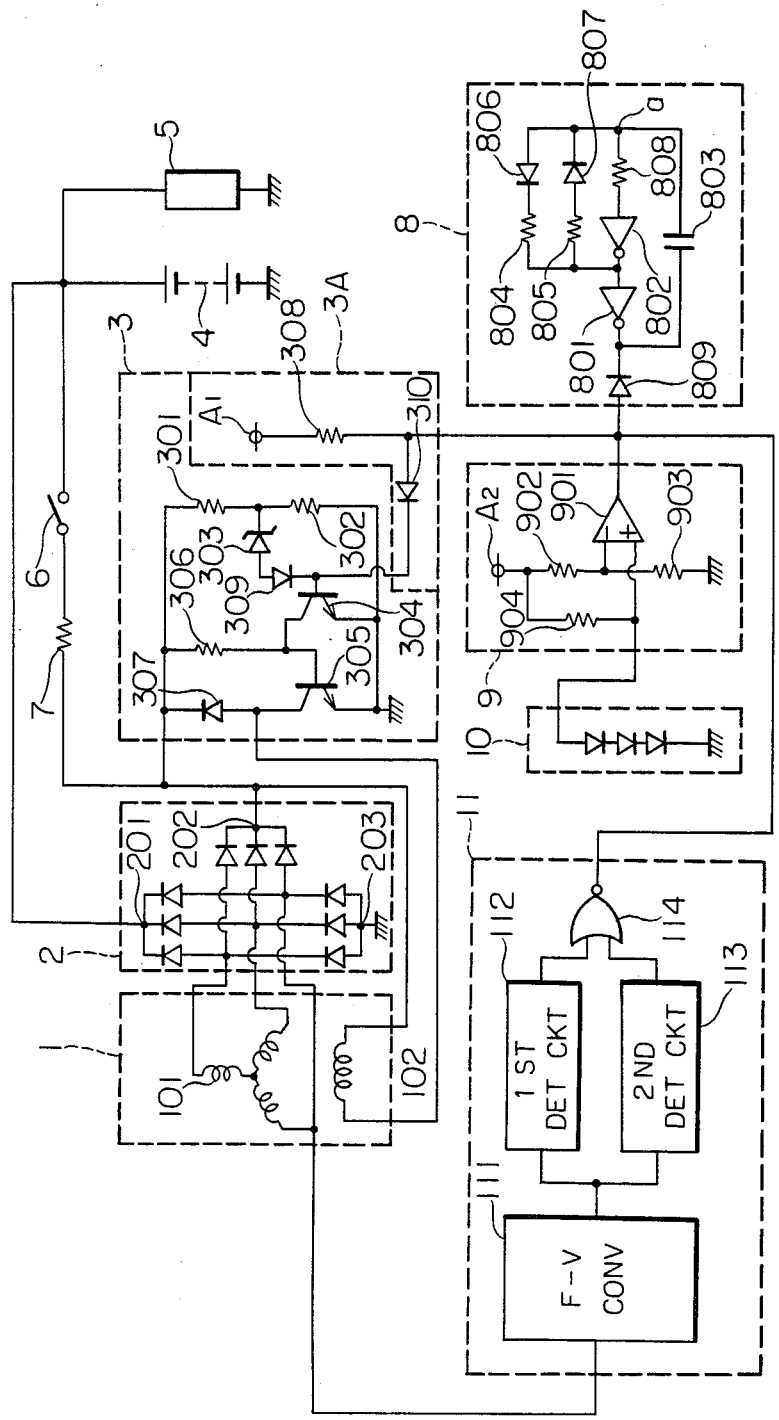
FIG. 7 is a circuit diagram showing still another embodiment of a control apparatus according to this invention.

FIG. 7 shows still another embodiment of this invention, in which an r.p.m. detector 11 is added to the embodiment of FIG. 3.

The r. p. m. detector 11 is constructed of components to be described below. An F-V (frequency-to-voltage) converter 111 receives the A-C output of the armature coil 101 of the generator 1 and converts it into a voltage value proportional to an A-C frequency. A first detection circuit 112 and a second detection circuit 113 receive the output voltage of the F-V converter 111, and detect whether or not the rotational speed of the generator 1 has reached respective r.p.m. levels as predetermined. A NOR gate 114 (of the open collector type) receives the output of the first detection circuit 112 and the second detection circuit 113.

The anode side of the reverse current preventing diode 809 which is the output side of the constant duty factor oscillator 8, the output side of the comparator 901 which is the output side of the temperature detector 9, and the output side of the NOR gate 114 which is the output side of the r.p.m. detector 11 are connected in common to the node between the base resistor 308 and the reverse current preventing diode 310.

Figure 8:
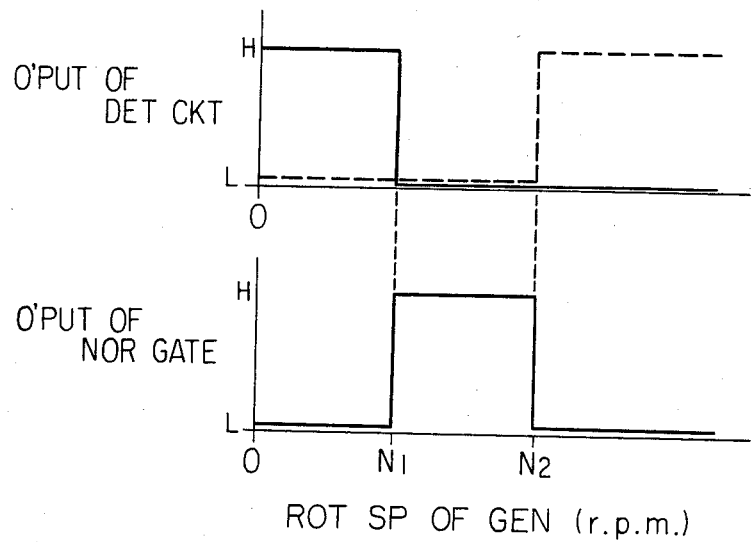
FIG. 8 is a timing chart of operations versus the rotational speed of a generator in FIG. 7.

FIG. 8 is an operation timing chart of the r.p.m. detector 11 in FIG. 7. In the chart, the axis of ordinates represents the output level, while the axis of abscissas represents the rotational speed of the generator 1. The upper stage of the chart illustrates the outputs of both the detection circuits 112 and 113, that is, a solid line indicates the output of the first detection circuit 112 while a coarse broken line indicates the output of the second detection circuit 113. The lower stage illustrates the output of the NOR gate 114.

Figure 9:
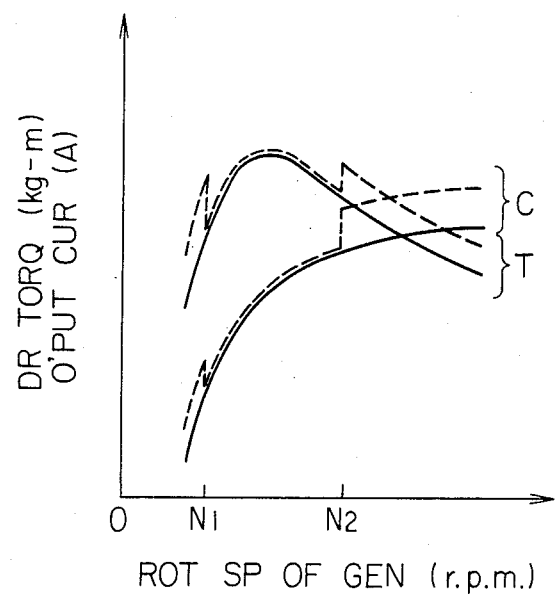
FIG. 9 is a graph showing an example of the characteristic curves of the generator in FIG. 7.

FIG. 9 shows the curves C of the output currents of the generator 1 and the curves T of the driving torques thereof versus the rotational speed of the generator 1 under the full-load condition thereof as based on this invention. Broken lines correspond to the cold condition of the generator 1, and solid lines the hot condition thereof.

In such a construction, the operations of the circuits except the r.p.m. detector 11 are the same as in the foregoing and shall be omitted from the description.

Now, an operation concerning the r.p.m. detector 11 will be described assuming that the output of the temperature detector 9 be at the "H" level. As stated before, the F-V converter 111 receives the A-C output of the armature coil 101 of the generator 1 and delivers a voltage proportional to the frequency of the A-C waveform, namely, the rotational speed of the generator 1. The first detection circuit 112 and the second detection circuit 113 receive the output voltage of the F-V converter 111, and their outputs are respectively inverted when the received voltages have reached corresponding fixed values, that is, the rotational speed of the generator 1 has reached corresponding fixed r.p.m. values. Thus, as indicated by the detection circuit outputs in FIG. 8, the first detection circuit 112 provides the "H" level for the rotational speed of the generator 1 from 0 (r.p.m.) to $N_1$ (r.p.m.) and provides the "L" level for the speed above $N_1$ (r.p.m.), and the second detection circuit 113 provides the "L" level for the rotational speed of the generator 1 from 0 (r.p.m.) to $N_2$ (r.p.m.) and provides the "H" level for the speed above $N_2$ (r.p.m.). Next, as indicated by the NOR gate output in FIG. 8, the NOR gate 114 provides the "H" level in only the section in which both the outputs of the first detection circuit 112 and the second detection circuit 113 are at the "L" level, namely, the section in which the rotational speed of the generator 1 is between $N_1$ (r.p.m.) and $N_2$ (r.p.m.) inclusive, and it provides the "L" level in any other section. That is, likewise to the output operation of the temperature detector 9, when the output of the r.p.m. detector 11 being the output of the NOR gate 114 is at the "H" level, the on/off action of the transistor 304 of the voltage regulator 3 depends upon the state of the Zener diode 303 and the oscillation of the fixed duty factor oscillator 8, and when the output of the detector 11 is at the "L" level, the on/off action of the transistor 304 depends upon only the state of the Zener diode 303 as in the operation of the voltage regulator 3 in the prior art. Of course, when both the output of the temperature detector 9 and the output of the r.p.m. detector 11 are at the "L" level, the on/off action of the transistor 304 depends upon only the state of the Zener diode 303. After all, the field current of the generator 1 is limited only when the generator 1 is cold with its rotational speed lying in the section from $N_1$ (r.p.m.) to $N_2$ (r.p.m.).

As understood from the foregoing, when the generator 1 is in the cold condition immediately after the starting of the engine and the rotational speed thereof falls within the fixed range, the output current of the generator 1 can be suppressed. Curves expressive of such characteristics are shown in FIG. 9. As apparent from the curves, the peak of the cold-condition driving torque can be suppressed and cut in the way that the output current within the predetermined rotational speed range (from $N_1$ r.p.m. to $N_2$ r.p.m.) under the cold condition is suppressed as described above. Moreover, apart from the peak of the driving torque, especially in a high-speed revolution region, the cold-condition output current is not suppressed, so that this current can be effectively utilized.

In the embodiment, the output current has been suppressed only in the cold condition within the range within which the rotational speed of the generator 1 is from $N_1$ (r.p.m.) to $N_2$ (r.p.m.). However, this is not restrictive, but by way of example the output current of the generator 1 may well be similarly suppressed only in the cold condition within a range within which the rotational speed of the generator 1 is from 0 (r.p.m.) to $N_2$ (r.p.m.). In the embodiment, the practicable example of arrangement has been shown in FIG. 7. However, the embodiment need not be restricted thereto, and any means may be adopted as long as similar effects are attained.

As thus far described, according to the third embodiment of this invention, the control apparatus is so constructed that the output current of the generator is suppressed when the temperature of the generator is below a predetermined point and the rotational speed range of the generator in which the driving torque thereof exhibits a peak, so as to restrain the peak of the cold-condition driving torque. Accordingly, the effective output of the generator is not spoilt, the cold-condition output current can be effectively utilized in the high-speed region, and the load on the engine can be reduced. Therefore, the rotation of the engine is stabilized, and the quantity of fuel consumption of the engine can be saved.

What is claimed is:

1. A control apparatus for a vehicular generator for receiving a field current and having a cold output current, a cold driving torque, a hot output current and a hot driving torque, said apparatus comprising:
   a voltage regulator including switching means for switching the field current of the generator in accordance with an output voltage of the generator and a control input;
   temperature level detecting means for electrically detecting a temperature of the generator being below a predetermined temperature; and
   switching control means for providing said control input with a predetermined cycle in accordance with said detected temperature being below the predetermined temperature, so that the cold output current and drive torque are substantially the same as the hot output current and drive torque.

2. A control apparatus for a vehicular generator according to claim 1 wherein said switching control means is constructed of a fixed duty factor oscillator which generates an output with a predetermined time constant.

3. A control apparatus for a vehicular generator according to claim 1 wherein said switching control means is constructed of a variable duty factor oscillator which generates an output with a temperature-dependent time constant.

4. A control apparatus for a vehicular generator for receiving a field current and having a cold output current, a cold driving torque, a hot output current and a hot driving torque, said apparatus comprising:
   a voltage regulator including switching means for switching the field current of the generator in accordance with an output voltage of the generator and a control input;
   temperature level detecting means for electrically detecting a temperature of the generator being below a predetermined temperature;
   rotational speed level detecting means for detecting a rotational speed of the generator being within a predetermined range; and
   switching control means for providing said control input with a predetermined cycle in accordance with said detected temperature being below the predetermined temperature and said rotational speed being within a predetermined range, so that the cold output current and drive torque are substantially the same as the hot output current and drive torque.

5. A control apparatus for a vehicular generator for receiving a field current and having a cold ourput current, a cold driving torque a hot output current and a hot driving torque said apparatus comprising:
   a voltage regulator including switching means for switching the field current of the generator in accordance with an output voltage of the generator and a control input;
   temperature detecting means for electrically detecting a temperature of the generator being below a predetermined temperature;
   rotational speed level detecting means for detecting a rotational speed of the generator being within a predetermined range and including
      an F-V converter which receives a A-C output from an armature coil of the generator and which converts a frequency into a voltage value,
      a plurality of detection circuits which provide outputs in response to difference voltage values of the output of said F-V converter, and
      a NOR gate which provides an output in accordance with output values of said detection circuits; and
   switching control means providing said control input with a predetermined cycle in accordance with said detected temperature being below the predetermined temperature and said rotational speed being within a predetermined range, so that the cold output current and drive torque are substantially the same as the hot output current and drive torque.

* * * * *